US010741222B2

(12) United States Patent
Wilke et al.

(10) Patent No.: US 10,741,222 B2
(45) Date of Patent: Aug. 11, 2020

(54) DIVIDER WITH CAPTIVE SHOCK MOUNTS FOR STORAGE ENCLOSURE

(71) Applicant: Western Digital Technologies, Inc., San Jose, CA (US)

(72) Inventors: Jeffrey D. Wilke, Palmer Lake, CO (US); David W. Niss, Boulder, CO (US); Dana C. Fisher, Berthoud, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 211 days.

(21) Appl. No.: 15/818,119

(22) Filed: Nov. 20, 2017

(65) Prior Publication Data

US 2019/0156865 A1 May 23, 2019

(51) Int. Cl.
*G11B 33/00* (2006.01)
*G11B 33/08* (2006.01)
*G06F 1/18* (2006.01)
*G11B 33/12* (2006.01)

(52) U.S. Cl.
CPC .............. *G11B 33/08* (2013.01); *G06F 1/187* (2013.01); *G11B 33/00* (2013.01); *G11B 33/124* (2013.01); *G11B 33/128* (2013.01)

(58) Field of Classification Search
CPC ..... G11B 33/08; G11B 33/128; G11B 33/124; G06F 1/187; H05K 7/1421; H05K 7/18
USPC ................. 248/636, 27.1, 220.21; 312/223.1; 361/679.33, 3, 637
See application file for complete search history.

(56) References Cited

U.S. PATENT DOCUMENTS

| 5,233,594 | A  | * | 8/1993 | Wilhelm | G11B 33/124 360/98.01 |
| 6,498,722 | B1 | * | 12/2002 | Stolz | G06F 1/184 248/634 |
| 6,600,648 | B2 | * | 7/2003 | Curlee | G06F 1/184 312/334.7 |
| 6,926,378 | B2 | * | 8/2005 | Greenwald | H05K 7/1421 312/223.1 |
| 8,477,496 | B2 | * | 7/2013 | Zhang | G06F 1/187 165/122 |
| 8,480,039 | B2 | * | 7/2013 | Chang | G11B 33/124 248/27.1 |
| 9,134,754 | B2 | * | 9/2015 | Guo | G06F 1/16 |
| 9,442,538 | B1 | * | 9/2016 | Chen | E05B 65/006 |
| 9,508,392 | B2 | * | 11/2016 | Kyle | G11B 33/128 |

(Continued)

*Primary Examiner* — Nkeisha Smith

(57) ABSTRACT

Provided herein are systems and apparatus for capturing a shock mount in a storage enclosure divider. In one implementation, a divider assembly comprises a divider guide comprising a plurality of alignment stops configured to engage an alignment feature of a device carrier, a front top divider coupled to the divider guide, a rear top divider coupled to the divider guide, and a grommet assembly coupled to the divider guide and to the front top divider and to the rear top divider. The front and rear top dividers comprise pluralities of alignment stop apertures and grommet apertures formed therein with respective alignment stops extending therethrough. Each alignment stop aperture of the rear top divider has a respective alignment stop of the plurality of alignment stops extending therethrough. The grommet assembly comprises a pair of grommets, each extending through a respective grommet aperture.

20 Claims, 11 Drawing Sheets

(56) References Cited

U.S. PATENT DOCUMENTS

| | | | |
|---|---|---|---|
| 9,870,804 B2 * | 1/2018 | Niss | G11B 33/124 |
| 9,983,640 B2 * | 5/2018 | Kannler | G06F 1/187 |
| 2014/0353458 A1 * | 12/2014 | Wu | G11B 33/08 248/581 |
| 2016/0105987 A1 * | 4/2016 | Peng | H05K 7/1489 361/679.02 |
| 2016/0338217 A1 * | 11/2016 | Tonthat | H05K 7/1489 |

* cited by examiner

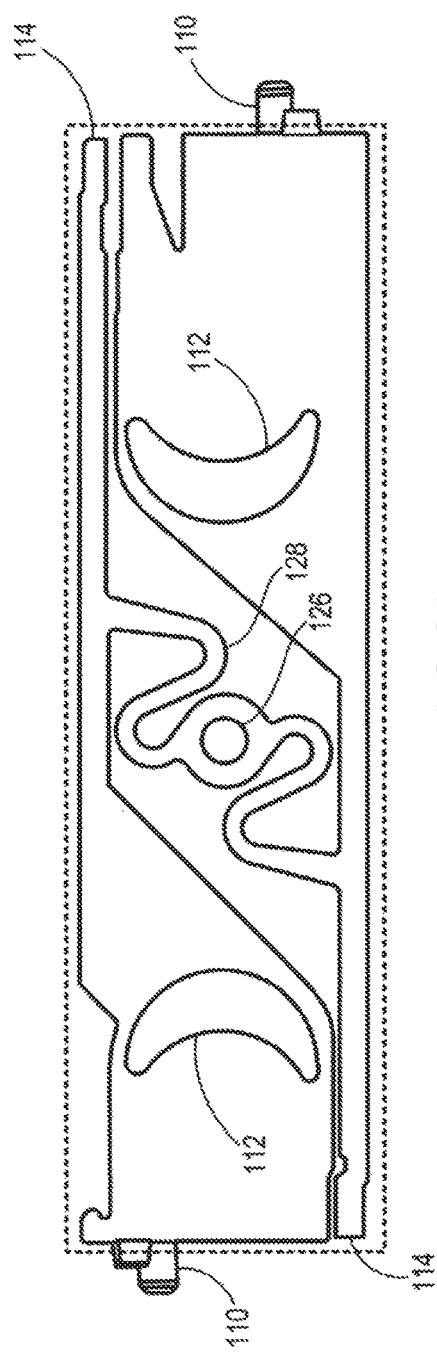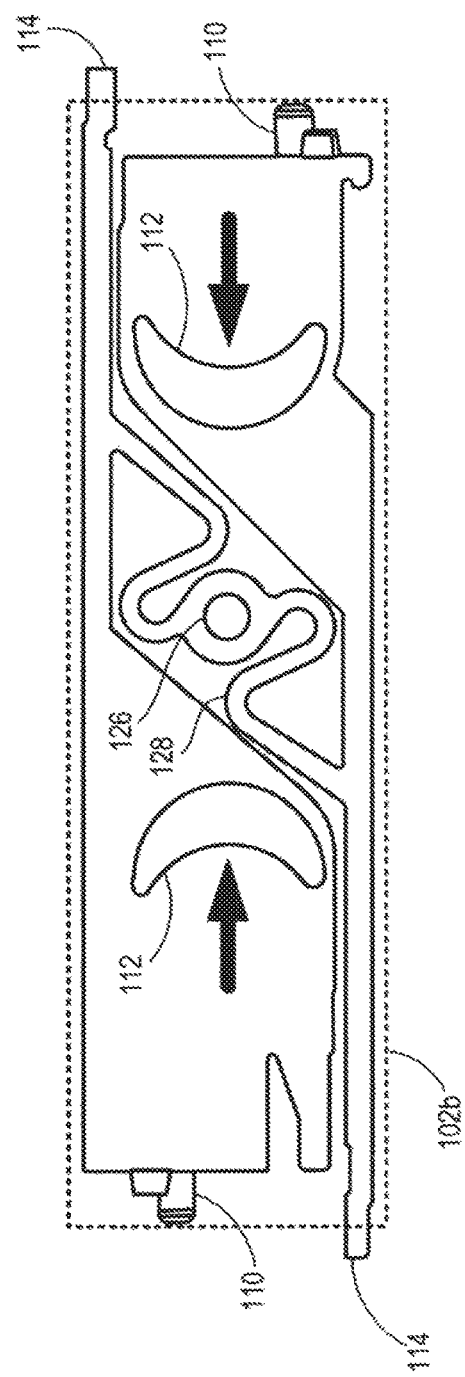
FIG. 3A
FIG. 3B

DIVIDER WITH CAPTIVE SHOCK MOUNTS FOR STORAGE ENCLOSURE

FIELD OF THE INVENTION

Aspects of the disclosure are related to vibration isolation grommets in a mounting system.

BACKGROUND

As computer systems and networks grow in numbers and capability, there is a need for more and more storage system capacity. Cloud computing and large-scale data processing further increase the need for digital data storage systems that are capable of transferring and holding immense amounts of data.

One approach to providing sufficient data storage is the use of arrays of independent hard disk drives. A number of hard disk drives can be held in a container or enclosure. The hard disk drives are held and operated in close proximity within the container, so that many hard disk drives can be fit into a defined volume. Rackmount enclosures can be used to hold very large amounts of data.

Hard disk drives include spinning disks that are typically rotated at high speeds, such as a speed of 7,200 RPM, for example. A read head is moved inward or outward from the center of the spinning disks in order to read and write data on the disk. These moving components can generate vibrations in the hard disk drive. Hard disk drives include traditional hard disk drives and hybrid drives (combination of traditional rotating storage and solid-state storage).

When a number of hard disk drives are included within a container, the vibrations generated by one hard disk drive can be transferred to other hard disk drives within the container. Additionally, vibrations external to the container may also be transferred to the hard disk drives. The transferred vibrations can interfere with operations of the affected hard disk drive or hard disk drives. The transferred vibrations can cause decreased performance or possible damage to components of the hard disk drive.

Overview

An apparatus comprising a captive-grommet vibration isolation system is provided. In one example, a divider assembly comprises a divider guide comprising a plurality of alignment stops configured to engage an alignment feature of a device carrier, a front top divider coupled to the divider guide, a rear top divider coupled to the divider guide, and a grommet assembly coupled to the divider guide and to the front top divider and to the rear top divider. The front top divider comprises a plurality of alignment stop apertures formed therein and a plurality of grommet apertures formed therein. Each alignment stop aperture of the front top divider has a respective alignment stop of the plurality of alignment stops extending therethrough. The rear top divider comprises a plurality of alignment stop apertures formed therein and a plurality of grommet apertures formed therein. Each alignment stop aperture of the rear top divider has a respective alignment stop of the plurality of alignment stops extending therethrough. The grommet assembly comprises a front grommet formed on a front side of a grommet substrate and a rear grommet formed on a rear side of the grommet substrate. The grommet assembly is positioned between the front top divider and the rear top divider, the front grommet extends through a respective grommet aperture of the plurality of grommet apertures of the front top divider and is configured to engage a first device carrier mounting pin, and the rear grommet extends through a respective grommet aperture of the plurality of grommet apertures of the rear top divider and is configured to engage a second device carrier mounting pin.

In another example, a mounting system comprises a pair of divider guides, wherein each divider guide comprises a plurality of alignment stops formed in a top portion thereof, a front top divider coupled to the top portion of the divider guide, a rear top divider coupled to the top portion of the divider guide and to the front top divider, and a grommet assembly captured between the front and rear top dividers. The plurality of alignment stops is configured to engage an alignment feature of a device carrier. The front top divider comprises a plurality of alignment stop apertures formed therein aligned with the plurality of alignment stops and a plurality of grommet apertures formed therein. The rear top divider comprises a plurality of alignment stop apertures formed therein aligned with the plurality of alignment stops and a plurality of grommet apertures formed therein. The grommet assembly comprises a front grommet extending through a respective grommet aperture of the front top divider and configured to engage a first device carrier mounting pin. The grommet assembly also comprises a rear grommet extending through a respective grommet aperture of the rear top divider and configured to engage a second device carrier mounting pin. The divider guides of the pair of divider guides positioned oppositely of one another to support the device carrier therebetween.

In another example, a method of making a mounting system comprises forming a divider guide comprising a plurality of alignment stops formed in a top portion thereof and forming a grommet assembly comprising forming a front grommet on a front side of a grommet substrate and forming a rear grommet on a rear side of a grommet substrate opposite the front side. The first grommet comprises an aperture configured to engage a first device carrier mounting pin, and the rear grommet comprises an aperture configured to engage a second device carrier mounting pin. The method also includes forming a front top divider having a plurality of alignment stop apertures formed therein and at least one grommet aperture formed therein. The method also includes forming a rear top divider having a plurality of alignment stop apertures formed therein and at least one grommet aperture formed therein. The method also includes attaching front and rear top dividers to each other and to the top portion of the divider guide, wherein attaching front and rear top dividers to each other and to the top portion of the divider guide comprises positioning the grommet assembly adjacently to the top portion of the divider guide and capturing the grommet assembly between the front and rear top dividers.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

FIGS. 3A and 3B illustrate operation of the data storage device carrier of FIGS. 2A and 2B according to an implementation.

FIG. 4 illustrates an exploded view of a divider assembly according to an implementation.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
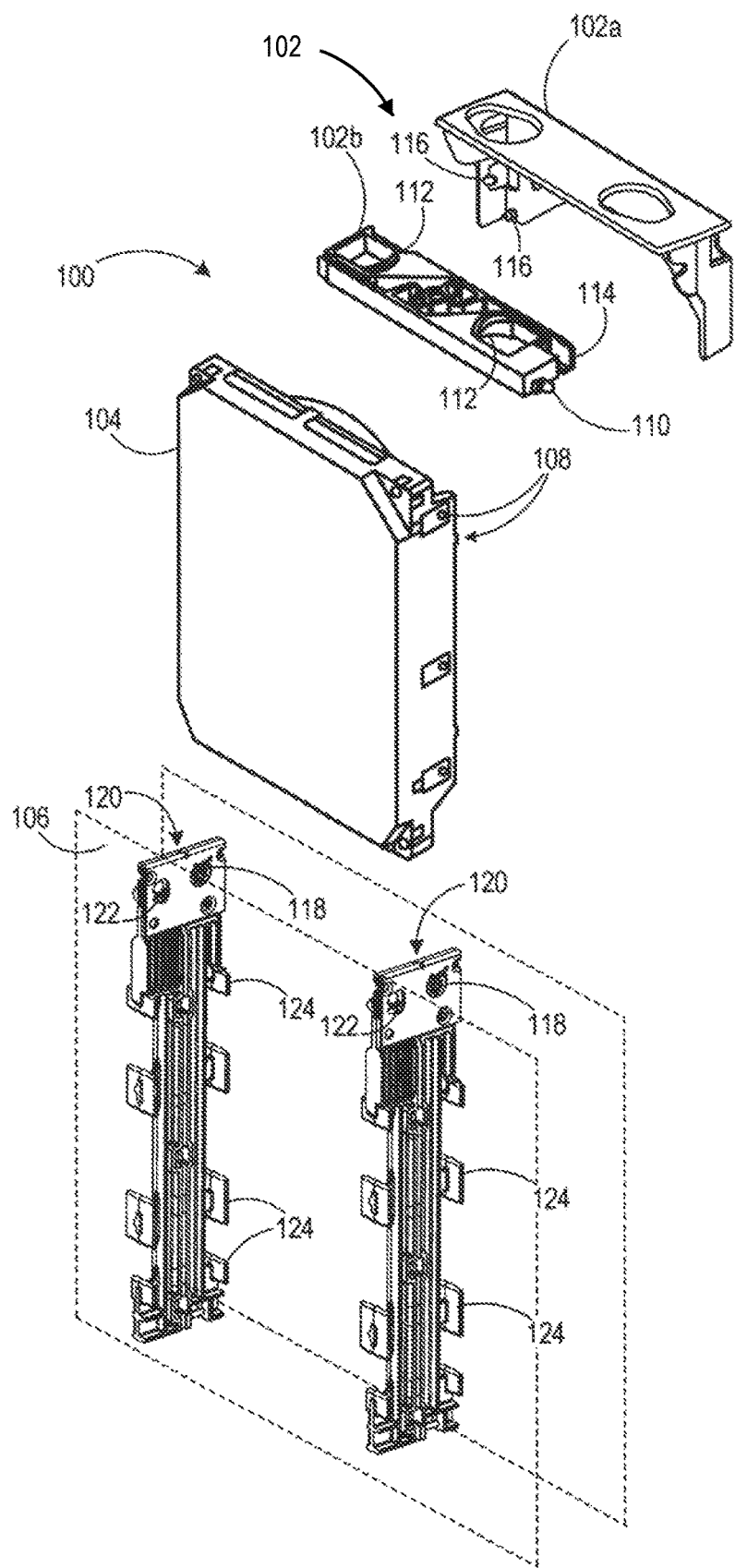
FIG. 1 illustrates a data storage device carrier for installing and mounting a data storage device into a data storage assembly according to an implementation.

FIG. 1 illustrates a data storage apparatus 100 including a data storage device carrier 102 and a data storage device 104. Data storage device carrier 102 facilitates installing and mounting data storage device 104 into a data storage assembly 106. The size, shape and general configuration of data storage device carrier 102 is configurable to adapt to external mounting features 108 or external surface features of data storage device 104 to accommodate different makes and models of data storage devices.

Data storage device carrier 102 comprises carrier 102b comprising mounting pins 110, finger grips 112, retractable alignment features 114 and data storage device carrier 102a comprising device mating features 116. Data storage device carrier 102 couples to external mounting features 108 of data storage device 104 and supports data storage device 104 in a vertical orientation in data storage assembly 106 from mounting pins 110.

Mounting pins 110 are configured to engage hanging features 118 of a divider assembly 120 of data storage assembly 106 to support data storage device 104 in a vertical orientation in data storage assembly 106. Mounting pins 110 are coupled to finger grips 112. Mounting pins 110 are extended when finger grips 112 are not actuated. Mounting pins 110 retract when finger grips 112 are actuated. In this particular example, mounting pins 110 have a circular cross-section and the corresponding hanging features 118 are configured to engage mounting pins 110 having a circular cross-section. However, different cross-sectional shapes such as squares, rectangles, triangles or other cross-sectional geometries will can be used as mounting pins 110 to support data storage device 104 in a vertical orientation within data storage assembly 106. Hanging features 118 correspond with the grommets described hereinbelow.

Finger grips 112 are coupled to mounting pins 110 and retractable alignment features 114 and configured to protrude retractable alignment features 114 concurrent with retracting mounting pins 110 when actuated to provide at least alignment during insertion of data storage device 104 into data storage assembly 106. Alternatively, finger grips 112 are configured to extend mounting pins 110 concurrent with retracting retractable alignment features 114 when de-actuated by the user. The size and shape of finger grips 112 can vary along with the data storage device carrier 102 to accommodate a variety of data storage devices 104.

Retractable alignment features 114 are configured to engage alignment stops 122 of divider assembly 120 to provide alignment of data storage device 104 during insertion of data storage device 104 into data storage assembly 106. In this manner, retractable alignment features 114 prevent overtravel during drive insertion. The size and shape of retractable alignment features 114 and associated alignment stops 122 can vary along with data storage device carrier 102 to accommodate different makes, models and brands of data storage devices. In this particular example, retractable alignment features 114 have a rectangular cross-section. However, the cross-section of retractable alignment features 114 can be square, circular, triangular or some other geometry capable of engaging associated alignment stops 122.

Data storage device 104 is a representation of a generic data storage device. Many data storage devices have external mounting features 108. The size, shape, and type of external mounting features 108 will vary by make, model and brand of data storage device. Therefore, data storage device carrier 102 is configurable to couple to different types of data storage devices while retaining the features described herein.

Device mating features 116 couple data storage device carrier 102 to data storage device 104 via external mounting features 108. Device mating features 116 can vary in size, shape and type to accommodate different makes, models and brands of data storage devices. In this particular example, device mating features 116 are configured to snap into external mounting features 108 of data storage device 104. However, device mating features 116 can include mechanical fasteners, such as screws or rivets, snap features, adhesives, hook-and-loop tape, or some other system for mechanically coupling one item to another.

Data storage assembly 106 secures data storage device 104 in a vertical orientation in data storage device 104. Data storage assembly comprises alignment stops 122 and hanging features 118. Data storage assembly 106 is further comprised of electronics, printed circuit boards, fans, fasteners, connectors and other features omitted in FIG. 1 for clarity.

Alignment stops 122 are configured to engage with retractable alignment features 114 of data storage device carrier 102. In addition to alignment stops 122, divider assembly 120 includes a plurality of alignment guides 124 that guide data storage device 104 as it is installed or removed. Alignment guides 124 permit an initial misalignment between retractable alignment features 114 and alignment stops 122 upon insertion of data storage device carrier 102 into data storage assembly 106. Alignment guides 124 correct alignment of data storage device during the insertion of data storage device 104 into data storage assembly 106. Alignment guides 124 may be comprised of many different shapes that can permit an initial amount of misalignment and correct the misalignment as data storage device carrier 102 is inserted into data storage assembly 106.

Hanging features 118 support data storage apparatus 100 in a vertical orientation within data storage assembly 106. Hanging features 118 are configured to mate with mounting pins 110. In this particular example, hanging features 118 are shown as having a circular cross-section. Hanging features 118 can have a variety of cross-sectional shapes such as squares, rectangles, or triangles so long as hanging features 118 are capable of mating with mounting pins 110.

Many manufacturing technologies can be employed to manufacture data storage device carrier 102, mounting pins 110, finger grips 112, retractable alignment features 114, device mating features 116, alignment stops 122, and hanging features 118. Plastics, injection molded plastics in particular, are suitable for manufacturing data storage device carrier 102, mounting pins 110, figure grips 112, retractable alignment features 114, and device mating features. However, these features can be made from a variety of materials. For example, aluminum, steel, composites or other materials capable of providing sufficient structure and physical properties to secure data storage device 104 in a vertical orientation within data storage device assembly 106 can be used. In one embodiment, a combination of plastic and metallic components may be manufactured according to their respective manufacturing methods to fabricate components of divider assembly 120.

Figure 2A:
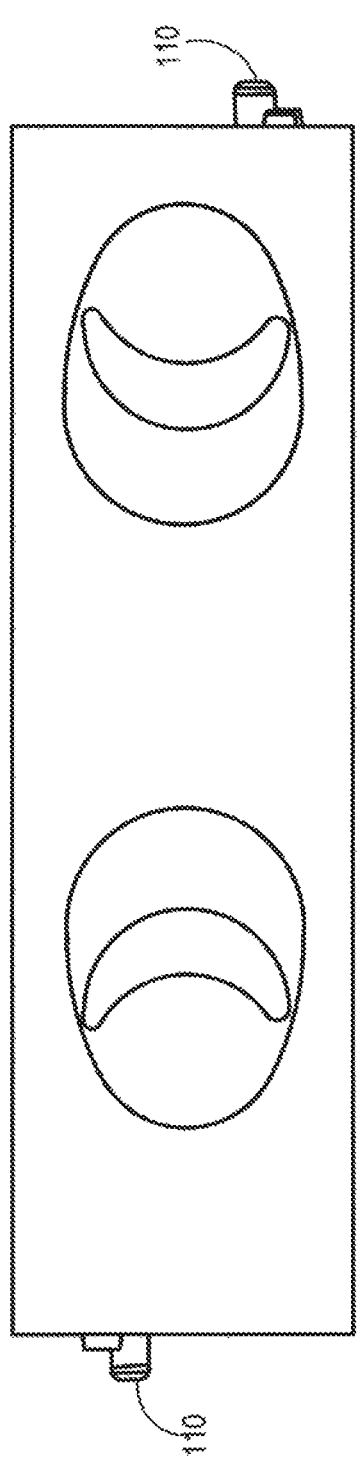
FIGS. 2A and 2B illustrate finger grips, mounting pins and alignment features for a data storage device carrier according to an implementation.
Figure 2B:
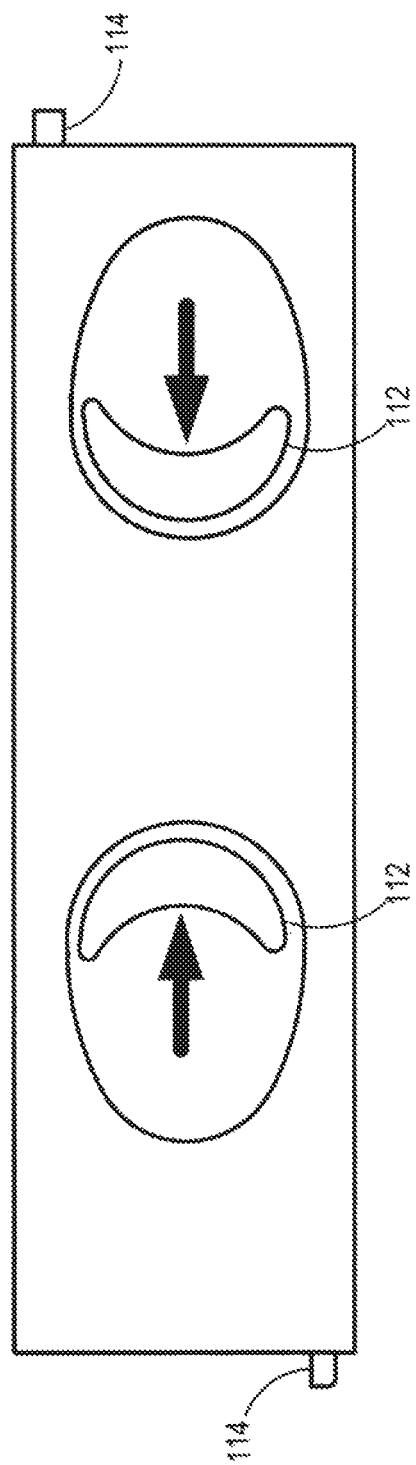

FIGS. 2A and 2B illustrate the operation of data storage device carrier 102 when finger grips 112 are actuated by a user. Finger grips 112 are coupled to mounting pins 110 and retractable alignment features 114 and are configured to protrude retractable alignment features 114 concurrent with retracting mounting pins 110. Alternatively, finger grips 112 are configured to at least protrude mounting pins 110 when de-actuated to engage mounting pins 110 in corresponding hanging features 118 of data storage assembly 106 to hang data storage device 104 by data storage device carrier 102 in a vertical orientation.

FIG. 2A illustrates data storage device carrier 102 when finger grips 112 are not actuated by a user. In this state, mounting pins 110 are extended while retractable alignment features 114 are retracted. FIG. 2B illustrates data storage device carrier 102 when finger grips 112 are actuated by a user. The arrows represent the squeezing action of a user actuating finger grips 112. In this state, mounting pins 110 are retracted while retractable alignment features 114 are extended. Many different mechanisms can be assembled to achieve the functionality described herein.

FIGS. 3A and 3B illustrate the operation of carrier 102*b*. The finger grips 112 are coupled to the one or more retractable alignment features 114 and the at least two mounting pins 110 and configured to extend one or more retractable alignment features 114 beyond carrier 102*b* concurrent with retracting mounting pins 110 when actuated by a user squeezing the finger grips 112 to provide at least alignment during insertion of data storage device 104 into data storage assembly 106. Alternatively, the one or more finger grips 112 are configured to extend at least two mounting pins 110 concurrent with retracting one or more retractable alignment features 114 when de-actuated by the user.

FIG. 3A illustrates carrier 102*b* when finger grips 112 are de-actuated. In this state, mounting pins 110 are extended while retractable alignment features 114 are retracted. FIG. 3B illustrates carrier 502 when finger grips 112 are actuated. The arrows represent the squeezing action of a user actuating finger grips 112. In this state, mounting pins 110 are retracted while retractable alignment features 114 are extended.

FIG. 3B illustrates carrier 102*b* when finger grips 112 are actuated. The squeezing action of the user actuating finger grips 112 is represented by the arrows. In this state finger grips 112 are moved closer together. A mounting hole 126 and carrier 102*b* linearly guide mounting pins 110 and retractable alignment features 114. In this state, mounting pins 110 are retracted and retractable alignment features 114 are extended.

FIGS. 3A and 3B also illustrate how mounting pins 110, finger grips 112 and retractable alignment features can comprise a single article of manufacture. In this particular example, mounting hole 126 provides a pivot point for hanging pins 110, finger grips 112 and retractable alignment features 114. FIG. 3A illustrates carrier 102*b* in its nominal state; that is, finger grips 112 are de-actuated. Finger grips 112 are at their farthest distance apart in this state. Also, mounting pins 110 are extended and retractable alignment features 114 are retracted. The geometry of carrier 102*b* includes a spring system 128. Spring system 128 and mounting hole 126 work together to maintain the nominal state shown in FIG. 3A.

Figure 4:
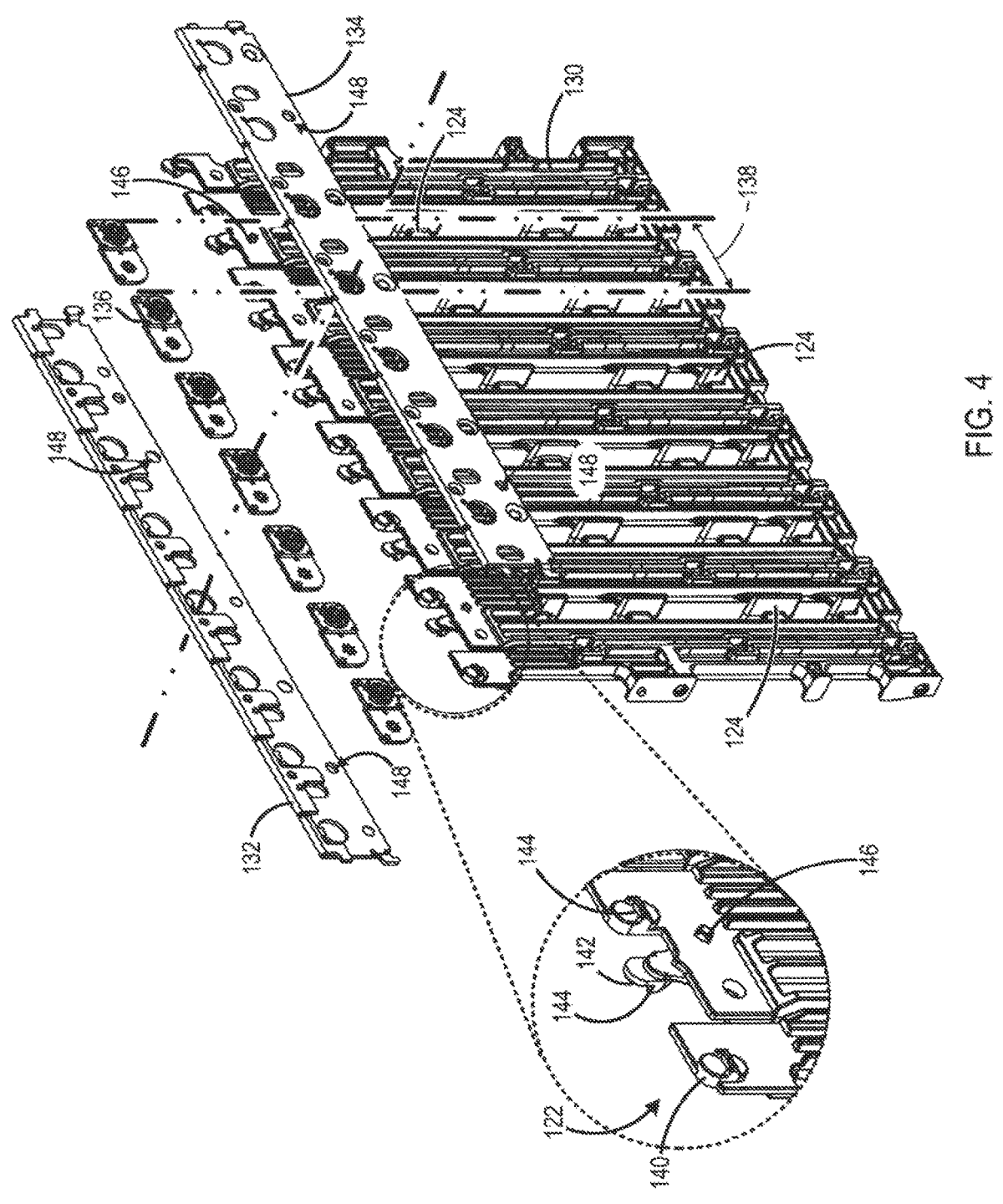

FIG. 4 illustrates an exploded view of a divider assembly 120 according to some embodiments. Divider assembly 120 includes a divider guide 130, a front top divider 132, a rear top divider 134, and at least one shock mount or grommet assembly 136. Alignment guides 124 define a plurality of installation spaces or channels 138 formed to allow a single data storage apparatus 100 to be installed therein. As illustrated in FIG. 4 and in other figures herein, divider assembly 120 can include a plurality of installation channels 138 sufficient to allow the installation and support of seven data storage apparatus 100 in a grouped set. However, this grouping of seven installation channels 138 is exemplary only, and embodiments of the invention contemplate other designs of divider assemblies 120 configured to support more or less than seven installation channels 138. In one embodiment, divider guide 130 is formed of plastic while front top divider 132 and rear top divider 134 are formed of metal.

Within each installation channel 138, divider guide 130 includes a pair of alignment stops 122, with each stop 140, 142 of the pair of stops 122 facing an opposite direction. In this manner, stop 142 provides installation support for a data storage device carrier 102 on one side of the divider guide 130 while stop 140 provides installation support for a data storage device carrier 102 on the opposite side. Alignment stops 140, 142 include a stop shelf or ledge 144 against which an alignment feature 114 may contact during installation. In response to coming into contact, stop shelf 144 prevents further insertion of the data storage apparatus 100 in the installation direction. In this position, the mounting pins 110 of the data storage apparatus 100 are aligned with respective grommet assemblies 136.

Further, each installation channel 138 includes a grommet assembly 136 that provides support for respective data storage apparatus 100 on opposite sides of divider guide 130.

Front top divider 132 and rear top divider 134 secure to one another via fastening hardware. The grommet assemblies 136 and a top portion of the divider guide 130 (including the alignment stops 122) are secured between the front and rear top dividers 132, 134 when they are secured together. To assist an alignment of front and rear top dividers 132, 134 during assembly, one or more alignment pins 146 are formed in the top portion of divider guide 130 on both sides. Alignment pins 146 align with alignment apertures 148 on front and rear top dividers 132, 134.

Figure 5A:
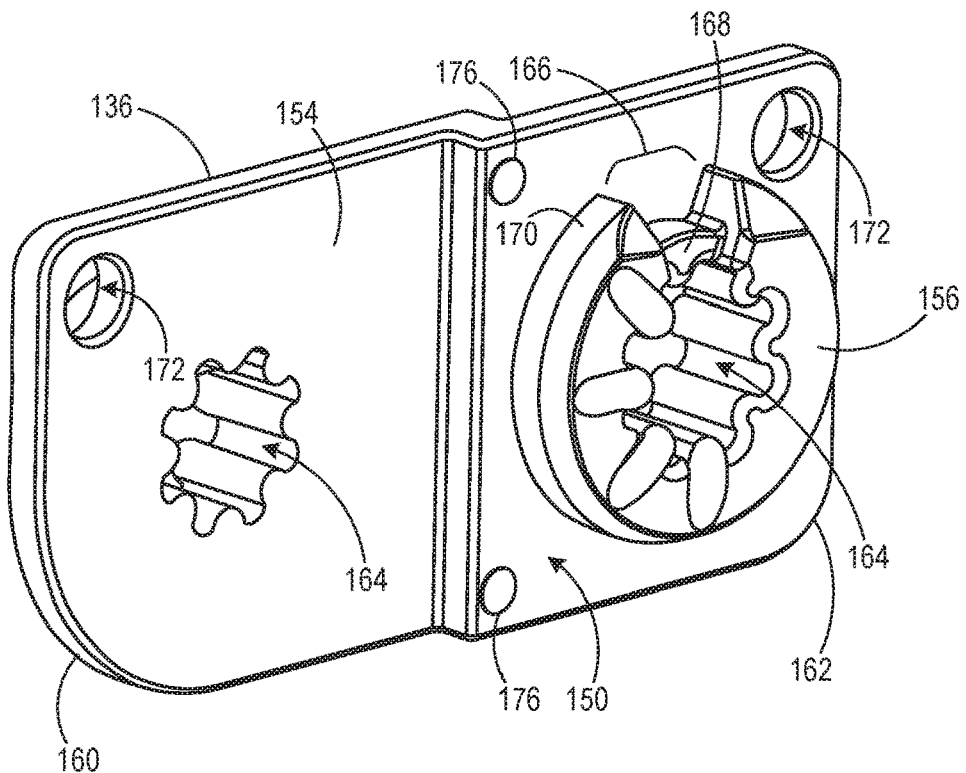
FIG. 5A illustrates an isometric view of one side of a grommet assembly according to an implementation.
Figure 5B:
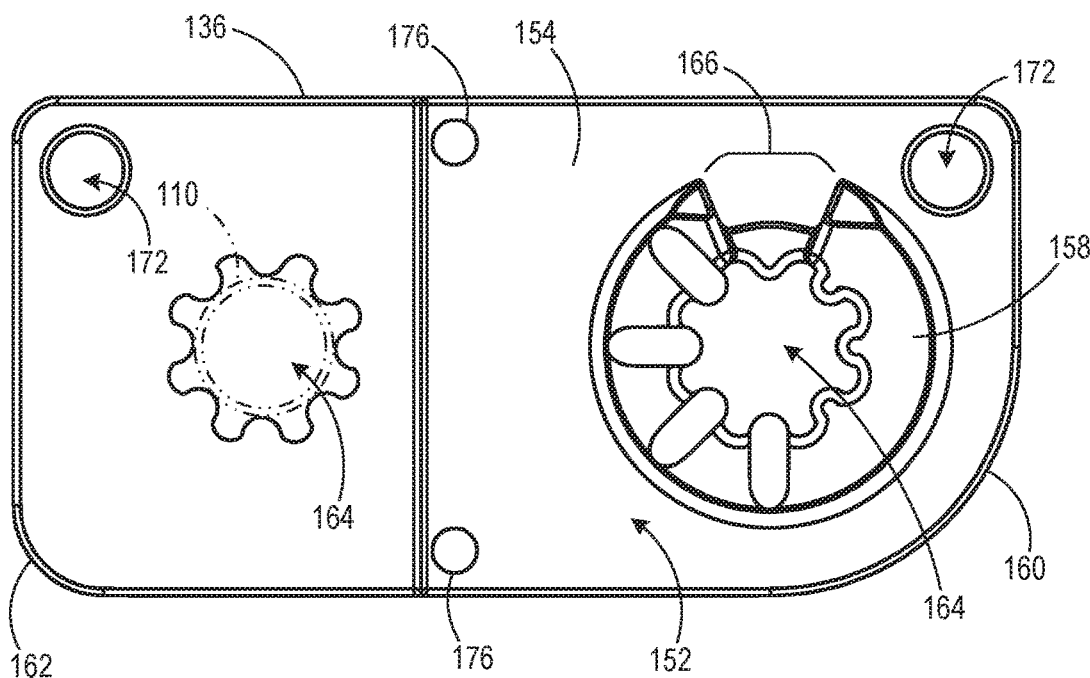
FIG. 5B illustrates a plan view of the other side of the grommet assembly shown in FIG. 5A. according to an implementation.

FIG. 5A illustrates an isometric view of one side 150 ("side 150") of grommet assembly 136. FIG. 5B illustrates a plan view of the other side 152 ("side 152") of grommet assembly 136. As shown in FIGS. 5A and 5B, grommet assembly 136 includes a double-sided grommet substrate 154 on which a first grommet 156 and a second grommet 158 are formed. Grommet 156 is a rear grommet and is formed on grommet assembly side 150 of grommet substrate 154, and second grommet 158 is a front grommet and is formed on grommet assembly side 152. The outer profile of the side plan view of grommet assembly 136 is not symmetrical on both sides 150, 152. That is, the profile of grommet side 150 does not look like the profile of grommet side 152. Grommets 156, 158 may also be different and have differently-formed ribs, grooves, channels, etc. to account for variations of the hardware on opposite sides of the data storage apparatus 100 or divider assembly 120. However, grommets 156, 158 may also be identical in an embodiment of the invention. The unsymmetrical profile includes a larger radius corner 160 and a smaller radius corner 162. Because of the unsymmetrical profile, correct installation of grommet assembly 136 is facilitated.

Grommets 156, 158 may be made from viscoelastic materials such as rubbers, silicones or other vibration damping materials and provide HDD drive isolation and interface directly with the data storage device carrier 102 when the data storage apparatus 100 is installed as described herein. Grommets 156, 158 include a central aperture 164 into which a respective mounting pin 110 of a data storage apparatus 100 extends. A channel 166 formed in grommets 156, 158 and a grommet bridge portion 168 act, together with a respective tab of front or rear top dividers 132 (see FIGS. 6A-7B, and 9), to guide a respective data storage device carrier mounting pin 110 into the central aperture 164 while avoiding shear force exertion on a protruding outer edge or wall 170 or other portion of the grommet 156, 158 that may cause an undesirable deformation of the grommet 156, 158. That is, the tab positioned in the channel 166 is configured to prevent entry of an extended mounting pin 110 within a space occupied by the grommet 156, 158 sufficient to allow the mounting pin 110 to exert a shear force on the outer wall 170 in a direction parallel to an installation direction of the data storage apparatus 100. Such deformation may cause the grommet 156, 158 to lose at least a portion of its vibration isolation ability and/or may cause the central aperture 164 to close sufficiently to prevent further insertions of mounting pins 110. Other deformations of the grommets 156, 158 that could be caused by the mounting pin 110 against portions of the grommets 156, 158 beyond the central aperture 164 in the installation direction are reduced or eliminated by stopping such additional insertion by the stops 140, 142 coming into contact with the respective alignment features 114.

Grommet assembly 136 includes a pair of support apertures 172 that align with grommet alignment pins 174 of front and rear top dividers 132, 134 (see FIGS. 6A-7B). In addition, four protrusions 176 provide extra compression to hold the grommet assembly 136 captive between the two top dividers 132, 134.

Grommets 156, 158 may be made from viscoelastic materials such as rubbers, silicones or other vibration damping materials and provide HDD drive isolation and interface directly with the data storage device carrier 102 when the data storage apparatus 100 is installed as described herein. Grommets 156, 158 include a central aperture 164 into which a respective mounting pin 110 of a data storage apparatus 100 extends. A channel 166 formed in grommets 156, 158 and a grommet bridge portion 168 act, together with a respective tab of front or rear top dividers 132 (see FIGS. 6, 7, and 9), to guide a respective data storage device carrier mounting pin 110 into the central aperture 164 while avoiding shear force exertion on a protruding outer edge or wall 170 or other portion of the grommet 156, 158 that may cause an undesirable deformation of the grommet 156, 158. That is, the tab positioned in the channel 166 is configured to prevent entry of an extended mounting pin 110 within a space occupied by the grommet 156, 158 sufficient to allow the mounting pin 110 to exert a shear force on the outer wall 170 in a direction parallel to an installation direction of the data storage apparatus 100. Such deformation may cause the grommet 156, 158 to lose at least a portion of its vibration isolation ability and/or may cause the central aperture 164 to close sufficiently to prevent further insertions of mounting pins 110. Other deformations of the grommets 156, 158 that could be caused by the mounting pin 110 against portions of the grommets 156, 158 beyond the central aperture 164 in the installation direction are reduced or eliminated by stopping such additional insertion by the stops 140, 142 coming into contact with the respective alignment features 114.

Figure 6A:
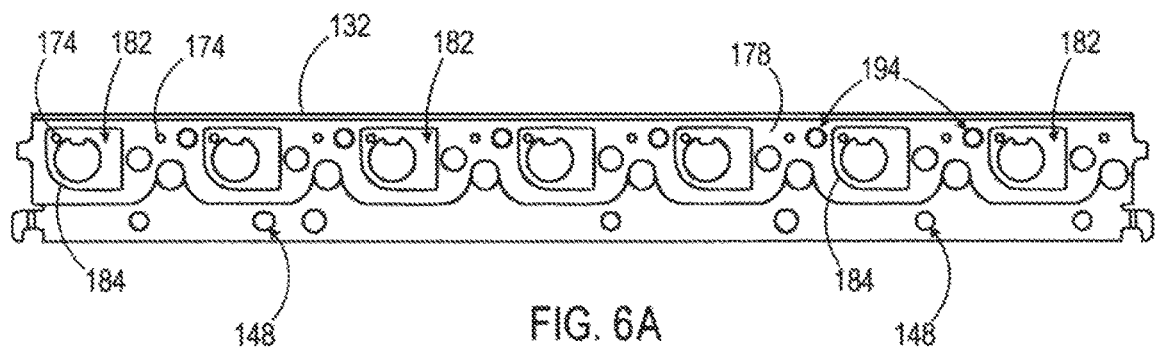
FIGS. 6A and 6B respectively illustrate an inner and outer side of a front top divider according to an implementation.
Figure 6B:
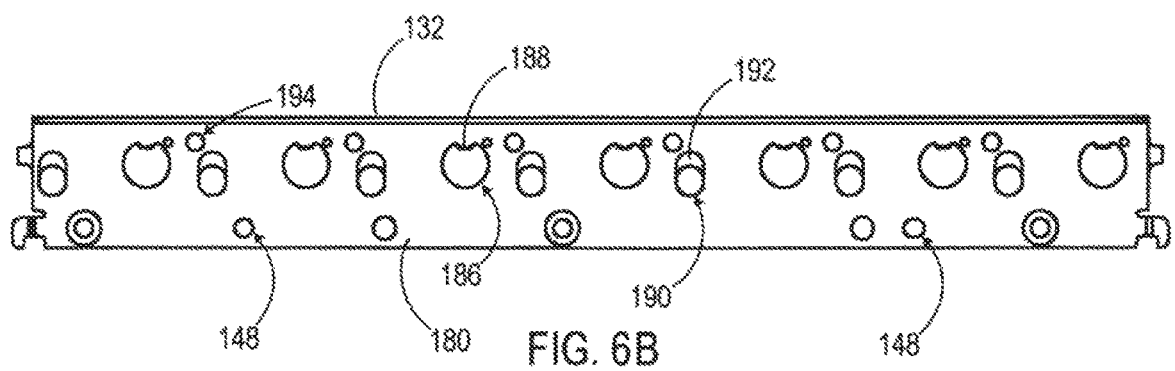

FIGS. 6A and 6B respectively illustrate an inner and outer side of front top divider 132. Front top divider 132 includes a first wall portion 178 that is folded over or bent to overlap a second wall portion 180. In a preferred embodiment, first wall portion 178 and second wall portion 180 are formed (e.g., stamped) in a single piece of material such as metal and then bent to form that shown herein. A pocket 182 for each installation space 138 that is provided by front top divider 132 (e.g., seven installation spaces 138) is formed in the first wall portion 178 and includes a rounded corner 184 that acts as a key to orient the large radius corner 160 of grommet assembly 136. Pockets 182 accept grommet side 152 therein.

A grommet aperture 186 formed in second wall portion 180 of front top divider 132 is aligned with each respective pocket 182 and includes a protrusion or tab 188 that is aligned with the channel 166 of the second grommet 158. Second wall portion 180 includes alignment stop apertures 190 formed therein that accept alignment stops 142 therein when installed on divider guide 130. A portion 192 of rounded corner 184 overlaps each alignment stop apertures 190 to support a portion of the alignment stop 142.

Front top divider 132 includes a plurality of installation apertures 194 formed through both wall portions 178, 180 to allow assembly and fastening of front top divider 132 to rear top divider 134.

Figure 7A:
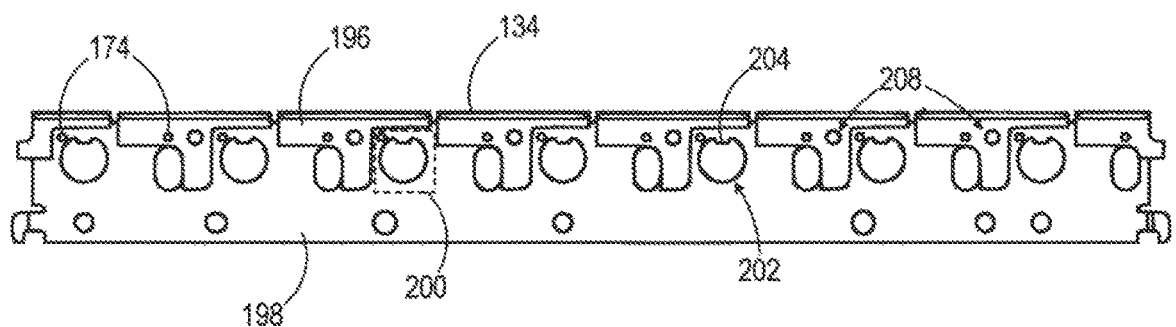
FIGS. 7A and 7B respectively illustrate an inner and outer side of rear top divider according to an implementation.
Figure 7B:
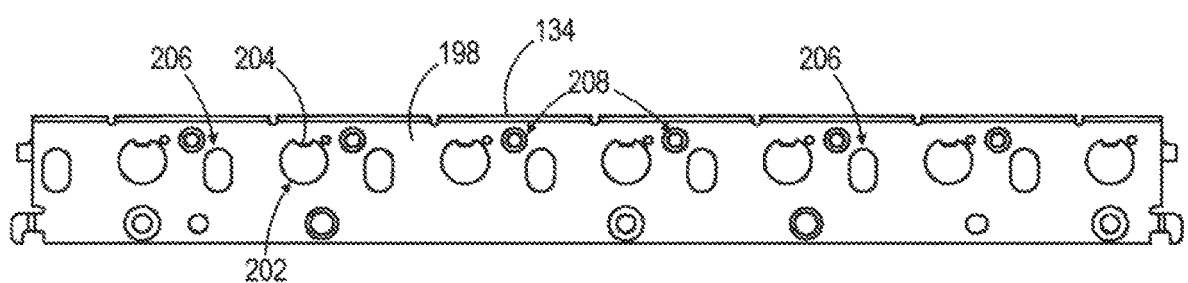

FIGS. 7A and 7B respectively illustrate an inner and outer side of rear top divider 134. Rear top divider 134 includes a first wall portion 196 that is folded over or bent to overlap a second wall portion 198. Rear top divider 134 is preferably formed out of a single piece of material similar to front top divider 132. A pocket 200 formed by first wall portion 196 accepts grommet side 150 therein. A grommet aperture 202 formed in second wall portion 198 includes a tab 204 that is aligned with the channel 166 of the first grommet 156 when positioned in grommet aperture 202. Second wall portion 198 includes alignment stop apertures 206 formed therein that accept alignment stops 140 therein when installed on divider guide 130. A plurality of installation apertures 208 align with installation apertures 194 of front top divider 132 during assembly to secure front and rear top dividers 132, 134 together with fastening hardware.

Figure 8:
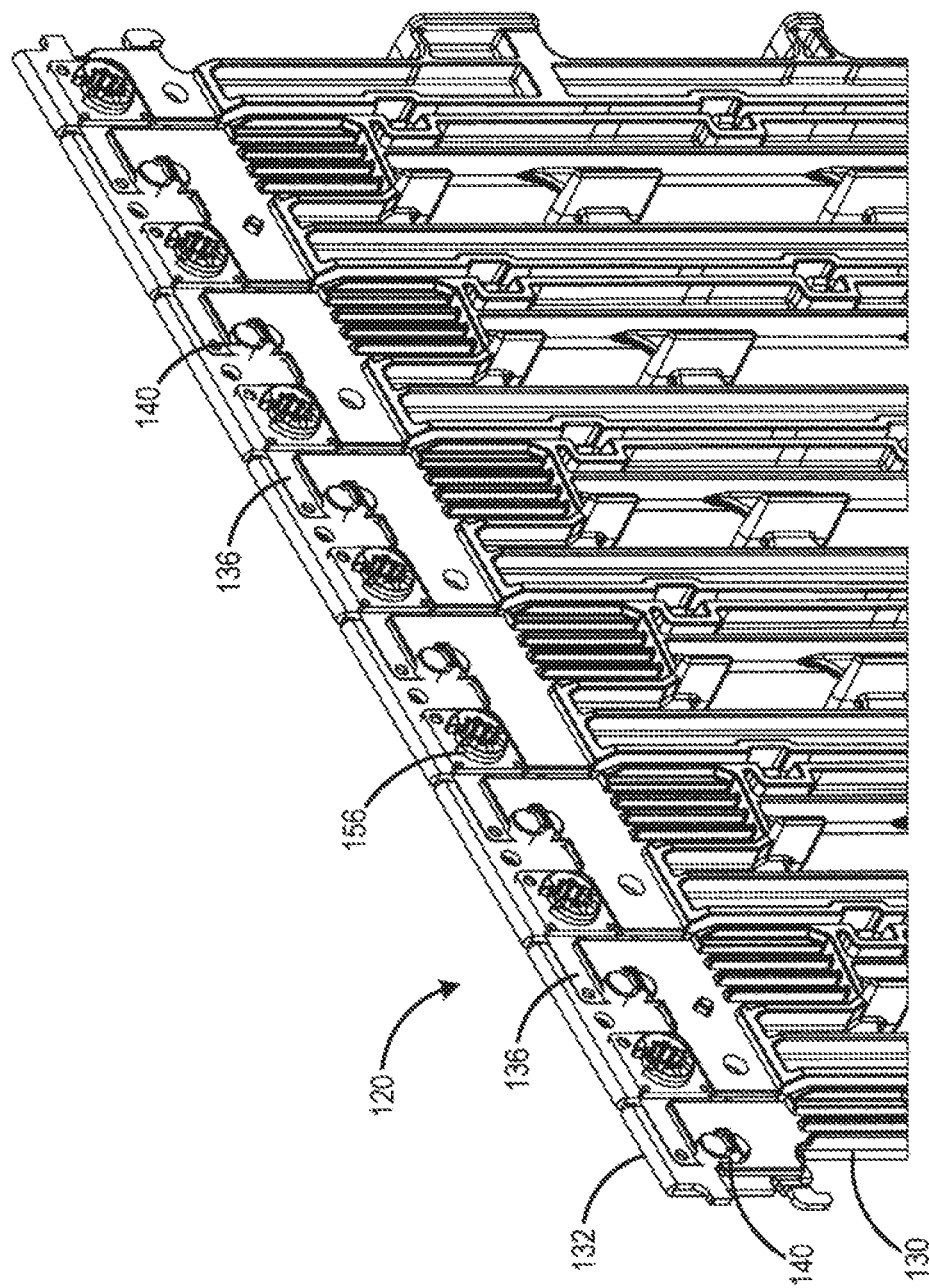
FIG. 8 shows an isometric view of a partially-assembled divider assembly according to an implementation.

FIG. 8 shows an isometric view of a partially-assembled divider assembly 120 to illustrate installation of front top divider 132, grommet assemblies 136, and divider guide 130. Rear top divider 134 is not shown in FIG. 8 to ease understanding of the positioning of front top divider 132, grommet assemblies 136, and divider guide 130. As shown, front top divider 132 and alignment stops 140 have grommet side 152 of the grommet assemblies 136 positioned therebetween.

Figure 9:
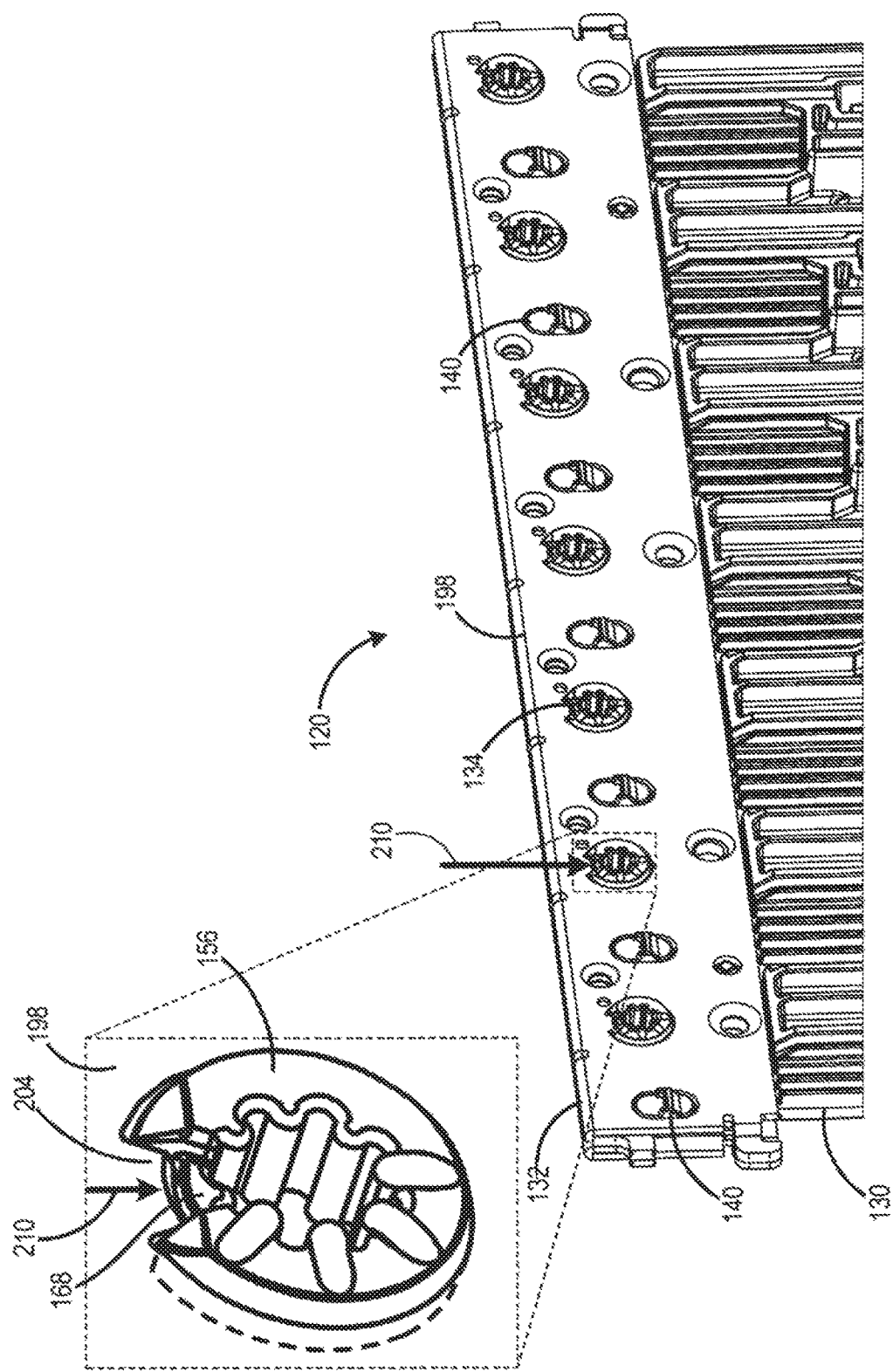
FIG. 9 shows an isometric view of a fully-assembled divider assembly according to an implementation.

FIG. 9 shows an isometric view of a fully-assembled divider assembly 120 to illustrate protrusion of grommet 156 through grommet aperture 202 of rear top divider 134. As illustrated in the expanded view, a portion of grommet 156 extends beyond second wall portion wall 198 of rear top divider 134. However, protruding edge 170 is covered and protected by second wall portion 198. An arrow 210 indicating an installation direction of the mounting pin 110 of a respective data storage apparatus 100 is shown to illustrate the path of movement of the mounting pin 110 during installation. As illustrated, grommet bridge portion 168 aligns with tab 204 to create a channel through which mounting pin 110 may pass if it is not retracted as shown in FIG. 2B. In this manner, the passage of mounting pin 110 through the channel avoids a collision between mounting pin 110 and protruding edge 170 to avoid damage to or distortion of grommet 156. Furthermore, when trapped between front and rear dividers 132, 134, displacement of the grommet assemblies 136 due to a force in the direction of mounting pin 110 extension is greatly reduced since grommet sides 150, 152 are trapped within respective pockets 200, 182. Accordingly, embodiments of the invention provide captive grommets resistant to shift or movement.

Figure 10:
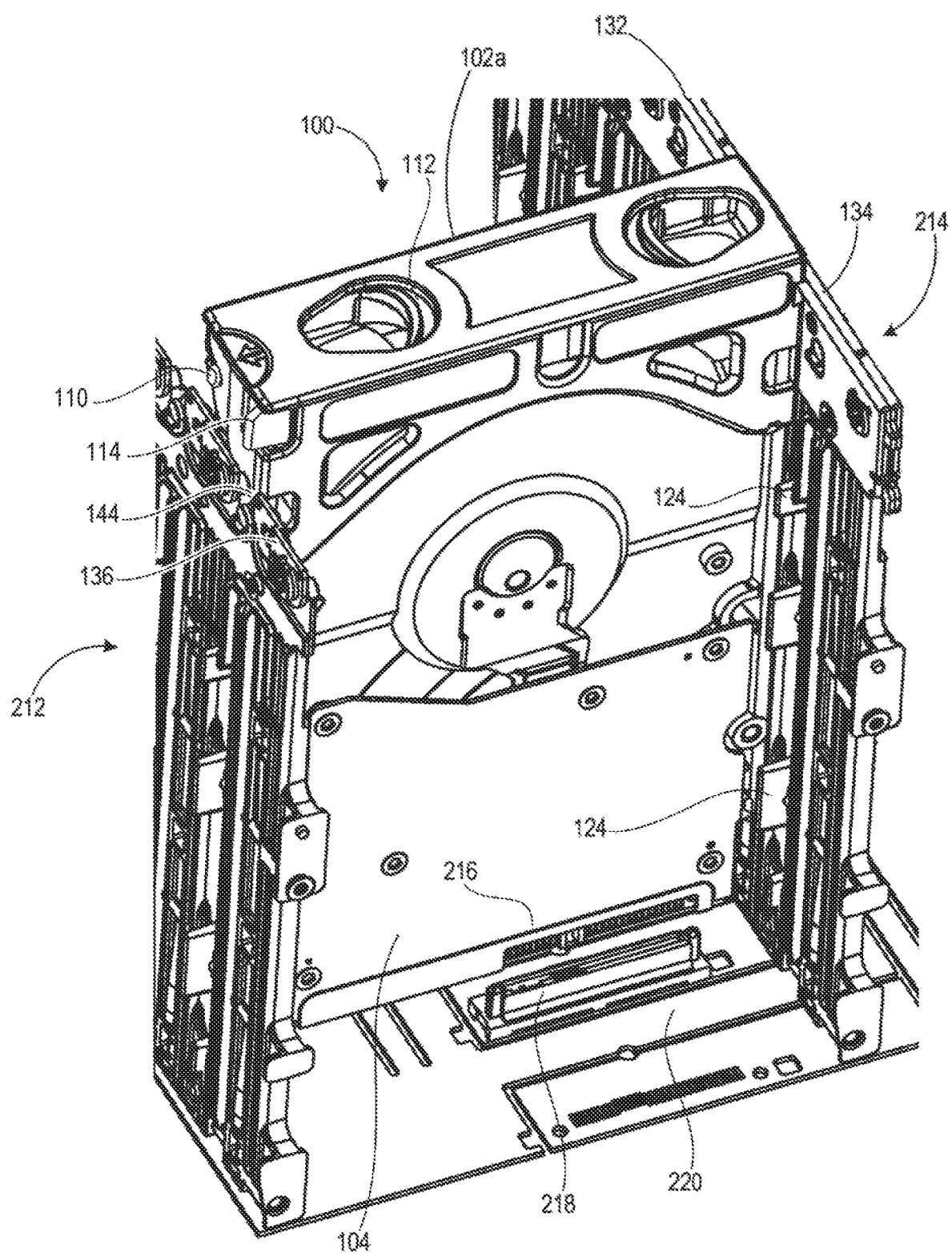
FIGS. 10 and 11 illustrate an example of installation of a data storage apparatus between a pair of divider assemblies according to an implementation.
Figure 11:
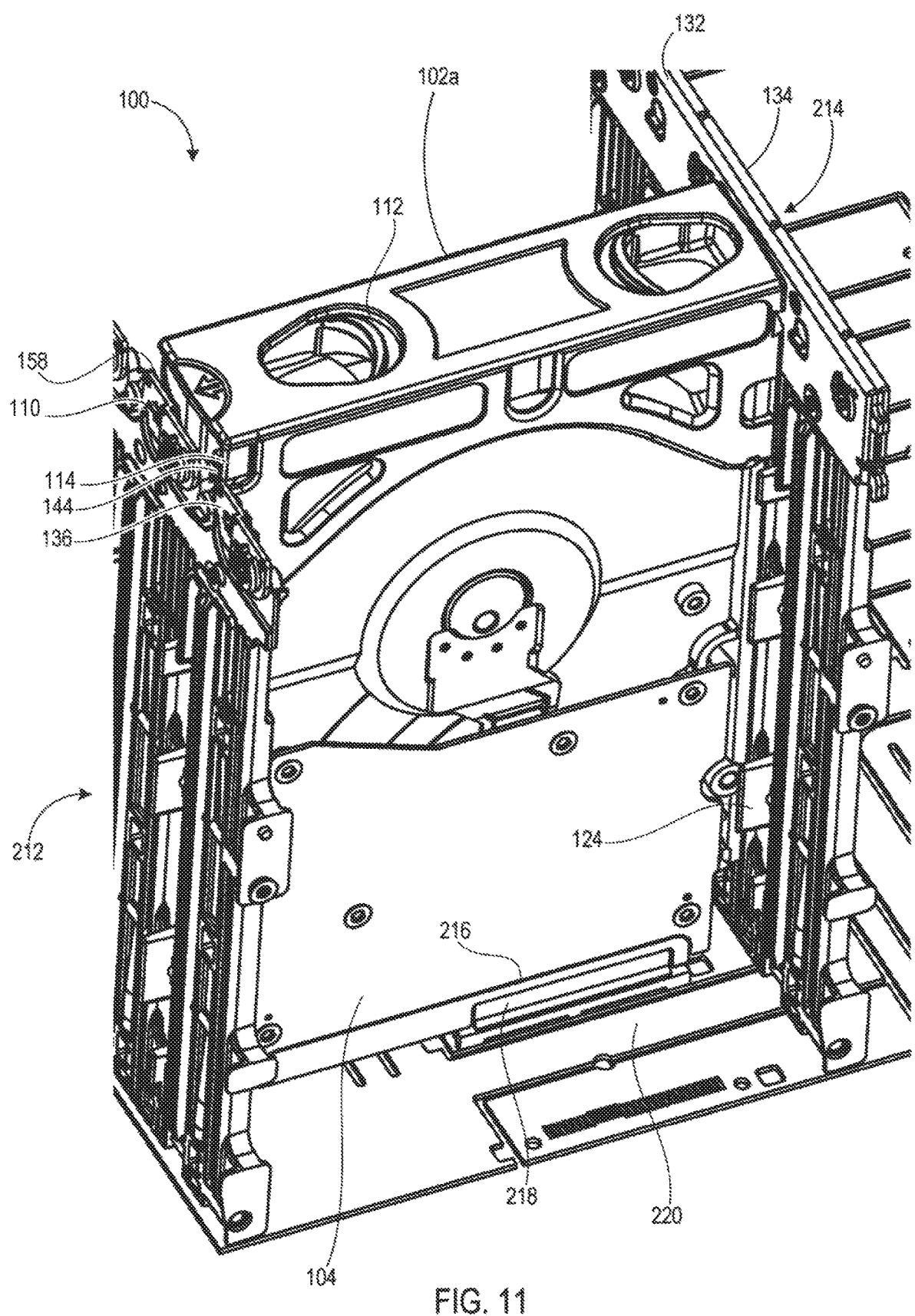

FIGS. 10 and 11 illustrate an example of installation of a data storage apparatus 100 between a pair of divider assemblies 120 (i.e., divider assemblies 212, 214) according to some embodiments. As shown in FIG. 10, finger grips 112 are engaged such that mounting pins 110 are retracted and alignment features 114 are extended. Data storage apparatus 100 is inserted in a downward installation direction in its installation space 138 between respective alignment guides 124. For ease of illustration only, the front and rear top dividers 132, 134 of divider assembly 212 are not shown; however, it is understood that in a complete installation, front and rear top dividers 132, 134 would be assembled on divider assembly 212. Extended alignment feature 114 is aligned with a stop shelf 144 of a respective alignment stop 140 of the divider guide 130 of divider assembly 212.

Data storage device 104 includes a connector 216 configured to be coupled with a connector 218 of a backplane 220. Divider assemblies 212, 214 are aligned with backplane 220 such that when external mounting feature 108 of data storage apparatus 100 is aligned with its respective grommet assembly 136, connectors 216, 218 are coupled together to provide signal communication back and forth between data storage apparatus 100 and backplane 220 as shown in FIG. 11. Referring to FIG. 11, mounting pin 110 is extended and protrudes into its respective grommet 158, and mounting pin 110 is withdrawn or retracted into data storage device carrier 102a.

Figure 12:
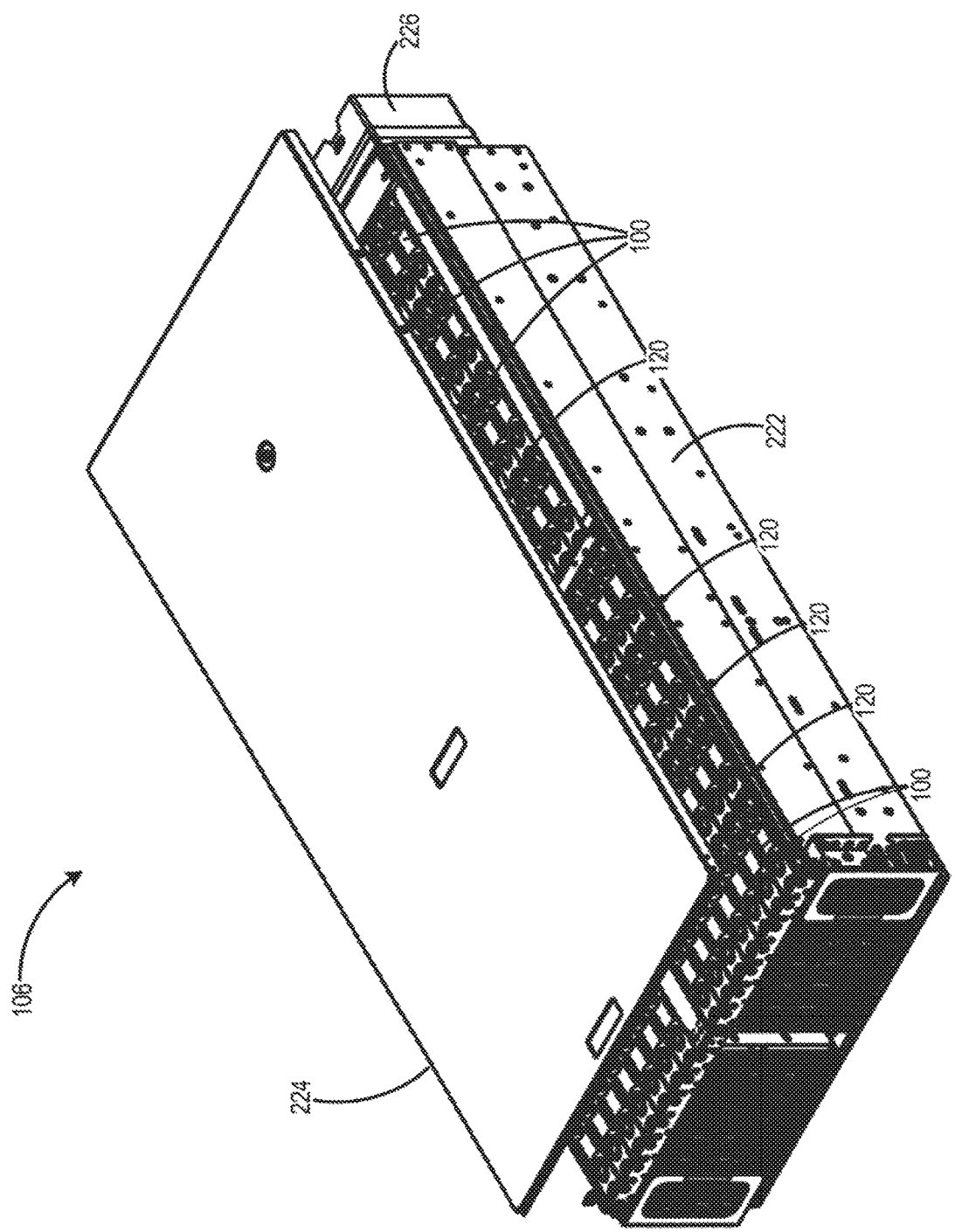
FIG. 12 illustrates the data storage assembly of FIG. 1 according to another implementation.

FIG. 12 illustrates data storage assembly 106 according to an embodiment of the invention. Data storage assembly 106 includes a chassis 222 and a chassis cover 224 with a plurality of data storage apparatus 100 positioned therein. One or more fans 226 are connected to the chassis 222 to provide cooling airflow through the internal volume of the chassis 222. Data storage assembly 106 secures data storage devices 104 in a vertical orientation. Data storage assembly 106 comprises alignment guides divider assemblies 120 supporting data storage apparatus 100 in multiple rows and columns. Data storage assembly 106 is further comprised of electronics, printed circuit boards, fasteners, connectors and other features omitted for clarity.

Embodiments of the invention thus provide a divider assembly comprising a grommet assembly having dual grommets that have a large bearing surface that is clamped by two sheet metal parts that minimize distortion. The thickness of the divider assembly is similar to existing dividers and allows the divider assembly disclosed herein to be used in multi-drive systems in which the density of drives per volume of the enclosure is to be substantially similar to similar enclosures known in the art. The captured grommet does not require adhesive to maintain the grommet assembly in place; thus, associated costs are eliminated. The elimination of high shear force exertion on the grommets by mounting pins of the data storage apparatus lowers the insertion/installation force and prevents greatly reduces or eliminates interference that can lead to distorted and dislodged individual grommets. The disclosed grommet assembly is also larger than the individual grommets themselves (i.e., the two grommets of the grommet assembly); thus, assembly is easier than for a system with individual separate grommets.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

The invention claimed is:

1. A divider assembly comprising:
  a divider guide comprising a plurality of alignment stops each comprising a stop shelf configured to engage in contact with an alignment feature of a device carrier;
  a front top divider coupled to the divider guide and comprising:
    a plurality of alignment stop apertures formed therein, wherein each alignment stop aperture of the front top divider has a respective alignment stop of the plurality of alignment stops extending therethrough; and
    a plurality of grommet apertures formed therein;
  a rear top divider coupled to the divider guide and to the front top divider and comprising:
    a plurality of alignment stop apertures formed therein, wherein each alignment stop aperture of the rear top divider has a respective alignment stop of the plurality of alignment stops extending therethrough; and
    a plurality of grommet apertures formed therein; and
  a grommet assembly coupled to the divider guide and to the front top divider and to the rear top divider and comprising;
    a grommet substrate;
    a front grommet formed on a front side of the grommet substrate; and
    a rear grommet formed on a rear side of the grommet substrate, wherein:
      the grommet assembly is positioned between the front top divider and the rear top divider;

the front grommet extends through a respective grommet aperture of the plurality of grommet apertures of the front top divider and is configured to engage a first mounting pin of the device carrier; and the rear grommet extends through a respective grommet aperture of the plurality of grommet apertures of the rear top divider and is configured to engage a second mounting pin of the device carrier.

2. The divider assembly of claim 1, wherein:
each grommet aperture of the front top divider has a tab extending therein;
the front grommet extends outwardly from the front side of the grommet substrate and defines a channel into which the tab of a respective grommet aperture is positioned;
each grommet aperture of the rear top divider has a tab extending therein; and
the rear grommet extends outwardly from the rear side of the grommet substrate and defines a channel into which the tab of a respective grommet aperture is positioned.

3. The divider assembly of claim 2, wherein the tab positioned in the channel defined by the front grommet is configured to prevent entry of an extended mounting pin of the device carrier within a space occupied by the front grommet sufficient to allow the mounting pin to exert a shear force on an outer wall of the front grommet in a direction parallel to an installation direction of the device carrier.

4. The divider assembly of claim 1, wherein the divider guide further comprises:
a first pair of alignment guides on a first side of the divider assembly defining a first installation channel for a first device apparatus comprising a first device carrier; and
a second pair of alignment guides on a second side of the divider assembly defining a second installation channel for a second device apparatus comprising a second device carrier.

5. The divider assembly of claim 4, wherein:
a first alignment stop of the plurality of alignment stops extending through a respective alignment stop aperture of the front top divider is positioned to engage the alignment feature of the first device carrier positioned in the first installation channel;
the front grommet is positioned to engage a respective mounting pin of the device carrier positioned in the first installation channel;
a second alignment stop of the plurality of alignment stops extending through a respective alignment stop aperture of the rear top divider is positioned to engage the alignment feature of another device carrier positioned in the second installation channel; and
the rear grommet is positioned to engage a respective mounting pin of the another device carrier positioned in the second installation channel.

6. The divider assembly of claim 4, wherein the first device apparatus comprises a data storage apparatus.

7. The divider assembly of claim 1, wherein:
the front top divider further comprises a first wall portion overlapping a second wall portion;
the rear top divider further comprises a first wall portion overlapping a second wall portion; and
the first wall portion of the front top divider abuts the first wall portion of the rear top divider.

8. The divider assembly of claim 7, wherein:
the plurality of alignment stop apertures formed in the front top divider are formed in the second wall portion of the front top divider; and the plurality of alignment stop apertures formed in the rear top divider are formed in the second wall portion of the rear top divider.

9. The divider assembly of claim 7, wherein:
an aperture formed in the first wall portion of the front top divider defines a pocket shaped to fit the front side of the grommet substrate therein; and
a pocket defined by a portion of the first wall portion of the rear top divider is shaped to fit the rear side of the grommet substrate therein.

10. A mounting system comprising:
a pair of divider guides, wherein each divider guide comprises:
a plurality of alignment stops each comprising a stop shelf and formed in a top portion thereof configured to engage in contact with an alignment feature of a device carrier;
a front top divider coupled to the top portion of the divider guide and comprising:
a plurality of alignment stop apertures formed therein aligned with the plurality of alignment stops; and
a plurality of grommet apertures formed therein;
a rear top divider coupled to the top portion of the divider guide and to the front top divider and comprising:
a plurality of alignment stop apertures formed therein aligned with the plurality of alignment stops; and
a plurality of grommet apertures formed therein; and
a grommet assembly captured between the front and rear top dividers and comprising:
a grommet substrate;
a front grommet extending through a respective grommet aperture of the front top divider and configured to engage a first mounting pin of the device carrier; and
a rear grommet extending through a respective grommet aperture of the rear top divider and configured to engage a second mounting pin of the device carrier; and
wherein divider guides of the pair of divider guides are positioned oppositely of one another to support the device carrier therebetween.

11. The mounting system of claim 10, wherein:
each grommet aperture of the front and rear top dividers has a tab extending therein;
the front grommet extends outwardly from a front side of a grommet substrate of the grommet assembly;
the rear grommet extends outwardly from a rear side of the grommet substrate;
a respective channel is formed in each of the front and rear grommets into which the tab of a respective grommet aperture is positioned; and
each tab is configured to prevent entry of an extended mounting pin of the device carrier within a space occupied by a respective front or rear grommet sufficient to allow the mounting pin to exert a shear force on an outer wall of the front or rear grommet in a direction parallel to an installation direction of the device carrier.

12. The mounting system of claim 10, wherein:
each divider guide further comprises:
a first pair of alignment guides on a first side thereof defining a first installation channel for a first device apparatus comprising a first device carrier; and a second pair of alignment guides on a second side of the divider assembly defining a second installation channel for a second device apparatus comprising a second device carrier;

the first installation channel defined by a first divider guide of the pair of divider guides defines a first portion of an installation position for the first device apparatus; and the second installation channel defined by a second divider of the pair of divider guides defines a second portion of the installation position for the first device apparatus.

13. The mounting system of claim 12, wherein each of a first alignment means of the first divider, a first alignment means of the second divider, a front vibration isolator of a first vibration isolation means of the first divider, and a rear vibration isolator of a first vibration isolation means of the second divider is correlated with the installation position and is configured to be engageable with a respective component of the device carrier.

14. A method of making a mounting system comprising:
forming a divider guide comprising a plurality of alignment stops formed in a top portion thereof;
forming a grommet assembly comprising:
  forming a front grommet on a front side of a grommet substrate, wherein the front grommet comprises an aperture configured to engage a first device carrier mounting pin; and
  forming a rear grommet on a rear side of a grommet substrate opposite the front side, wherein the rear grommet comprises an aperture configured to engage a second device carrier mounting pin;
forming a front top divider having:
  a plurality of alignment stop apertures formed therein; and
  at least one grommet aperture formed therein;
forming a rear top divider having:
  a plurality of alignment stop apertures formed therein; and
  at least one grommet aperture formed therein; and
attaching front and rear top dividers to each other and to the top portion of the divider guide;
wherein attaching front and rear top dividers to each other and to the top portion of the divider guide comprises:
  positioning the grommet assembly adjacently to the top portion of the divider guide; and
  capturing the grommet assembly between the front and rear top dividers.

15. The method of claim 14, wherein attaching front and rear top dividers to the top portion of the divider guide comprises:
aligning the plurality of alignment stop apertures formed in the front top divider with a first subset of the plurality of alignment stops formed in the top portion of the divider guide; and
aligning the plurality of alignment stop apertures formed in the rear top divider with a second subset of the plurality of alignment stops formed in the top portion of the divider guide.

16. The method of claim 14, wherein:
forming the front top divider comprises bending a first wall portion of a front top divider substrate over a second wall portion of the front top divider substrate to overlap the first wall portion of the front top divider substrate with the second wall portion of the front top divider substrate; and
forming the rear top divider comprises bending a first wall portion of a rear top divider substrate over a second wall portion of the rear top divider substrate to overlap the first wall portion of the rear top divider substrate with the second wall portion of the rear top divider substrate.

17. The method of claim 16, wherein:
forming the front top divider comprises forming an aperture in the first wall portion of the front top divider substrate that defines a pocket shaped to fit the front side of the grommet substrate therein; and
forming the rear top divider comprises forming the first wall portion of the rear top divider substrate to define a portion of a space shaped to fit the rear side of the grommet substrate therein.

18. The method of claim 16, wherein:
forming the front top divider comprises forming the front top divider from a metallic substrate;
forming the rear top divider comprises forming the rear top divider from a metallic substrate; and
forming the divider guide comprises forming the divider guide from a plastic substrate.

19. The method of claim 18, wherein:
forming the front top divider comprises stamping the front top divider from a single metallic plate; and
forming the rear top divider comprises stamping the rear top divider from a single metallic plate.

20. The method of claim 14, wherein forming a grommet assembly comprises forming the grommet assembly from a viscoelastic material.

* * * * *